(12) United States Patent
Rothman et al.

(10) Patent No.: US 9,489,029 B2
(45) Date of Patent: *Nov. 8, 2016

(54) OPERATING SYSTEM INDEPENDENT NETWORK EVENT HANDLING

(71) Applicant: INTEL CORPORATION, Santa Clara, CA (US)

(72) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/312,350

(22) Filed: Jun. 23, 2014

(65) Prior Publication Data

US 2014/0304540 A1 Oct. 9, 2014

Related U.S. Application Data

(62) Division of application No. 12/645,145, filed on Dec. 22, 2009, now Pat. No. 8,806,231.

(51) Int. Cl.
*G06F 1/00* (2006.01)
*G06F 1/32* (2006.01)

(52) U.S. Cl.
CPC ........... *G06F 1/3206* (2013.01); *G06F 1/3209* (2013.01)

(58) Field of Classification Search
CPC ........................................................ G06F 1/32
See application file for complete search history.

(56) References Cited

U.S. PATENT DOCUMENTS

| 7,134,125 | B2 | 11/2006 | Rothman et al. |
| 7,136,994 | B2 | 11/2006 | Zimmer et al. |
| 7,159,105 | B2 | 1/2007 | Rothman et al. |
| 7,165,170 | B2 | 1/2007 | Rothman et al. |
| 7,181,610 | B2 | 2/2007 | Zimmer et al. |
| 7,185,190 | B2 | 2/2007 | Rothman et al. |
| 7,188,262 | B2 * | 3/2007 | Arends et al. ................ 713/300 |
| 7,231,512 | B2 | 6/2007 | Rothman et al. |
| 7,269,768 | B2 | 9/2007 | Rothman et al. |
| 7,275,152 | B2 | 9/2007 | Goud et al. |
| 7,310,725 | B2 | 12/2007 | Zimmer et al. |
| 7,310,740 | B2 * | 12/2007 | Price .................... G06F 1/3203 713/300 |
| 7,320,052 | B2 | 1/2008 | Zimmer et al. |
| 7,373,537 | B2 | 5/2008 | Zimmer et al. |
| 7,383,450 | B2 | 6/2008 | Rothman |

(Continued)

FOREIGN PATENT DOCUMENTS

| CN | 1992611 A | 7/2007 |
| EP | 1978720 | 10/2008 |

OTHER PUBLICATIONS

Office Action mailed Jun. 4, 2014 for Chinese Application No. 201010621015.1, 9 pages.

(Continued)

*Primary Examiner* — Mohammed Rehman
(74) *Attorney, Agent, or Firm* — Schwabe, Williamson & Wyatt, P.C.

(57) ABSTRACT

Methods and apparatuses for re-instantiating a firmware environment that includes one or more firmware functions available at pre-boot time when transitioning the computing device from a wake state to a sleep state. A network event received by the computing device while in a sleep state may be handled by the firmware environment independent of the operating system and without returning the entire computing device to the wake state.

23 Claims, 4 Drawing Sheets

(56) References Cited

U.S. PATENT DOCUMENTS

| | | |
|---|---|---|
| 7,451,301 B2 | 11/2008 | Zimmer et al. |
| 7,478,141 B2 | 1/2009 | Rothman et al. |
| 7,543,048 B2 | 6/2009 | Rothman et al. |
| 7,549,055 B2 | 6/2009 | Zimmer et al. |
| 7,587,750 B2 | 9/2009 | Zimmer et al. |
| 7,730,205 B2 | 6/2010 | Rothman et al. |
| 2004/0230963 A1 | 11/2004 | Rothman et al. |
| 2004/0255106 A1 | 12/2004 | Rothman et al. |
| 2005/0015430 A1 | 1/2005 | Rothman et al. |
| 2005/0021968 A1 | 1/2005 | Zimmer et al. |
| 2005/0044363 A1 | 2/2005 | Zimmer et al. |
| 2005/0149711 A1 | 7/2005 | Zimmer et al. |
| 2006/0047986 A1* | 3/2006 | Kurts ............ G06F 1/3203 713/320 |
| 2006/0136756 A1 | 6/2006 | Rothman et al. |
| 2006/0206627 A1* | 9/2006 | Kardach ......... G06F 1/3203 710/5 |
| 2007/0105540 A1 | 5/2007 | Yu et al. |
| 2007/0234028 A1* | 10/2007 | Rothman ......... G06F 9/4418 713/1 |
| 2008/0126815 A1* | 5/2008 | Cantwell ......... G06F 1/3203 713/323 |
| 2008/0162809 A1 | 7/2008 | Rothman et al. |
| 2009/0132839 A1 | 5/2009 | Rothman et al. |
| 2009/0150660 A1 | 6/2009 | Yao et al. |
| 2009/0172381 A1 | 7/2009 | Zimmer et al. |
| 2010/0020933 A1* | 1/2010 | Topfer ............ G06T 5/50 378/98.11 |
| 2010/0169631 A1 | 7/2010 | Zimmer et al. |

OTHER PUBLICATIONS

Office Action mailed Feb. 9, 2015 for Chinese Application No. 201010621015.1, 7 pages.
"The Core Revolution," Phoenix Technologies, Strategy 2008, 24 pages.
Intel Corporation, "Intel Platform Innovation Framework for EFI Architecture Specification," Sep. 16, 2003, 120 pages.
Allman, M. et al., "Enabling an Energy-Efficient Future Internet Through Selectively Connected End Systems, "ACM SIGCOMM Sixth Workshop on the Hot Topics in Networks, Nov. 2007, pp. 1-7.
European Search Report mailed Jul. 14, 2011 for EP Application No. 10252077.2, 5 pages.
Agarwal, Y. et al, "Somniloquy: Maintaining Network Connectivity While Your Computer Sleeps," Microsoft Research, Mar. 2008, 14 pages.
Office Action mailed Sep. 25, 2011 for European Application No. 10252077.2, 6 pages.
Office Action mailed Jun. 29, 2012 for Korean Application No. 10-2011-131294, 2 pages.
Search Report mailed Feb. 25, 2013 for Chinese Application No. 201010621015.1, 2 pages.
Office Action mailed Mar. 5, 2013 for Chinese Application No. 201010621015.1, 13 pages.
Office Action mailed Nov. 20, 2013 for Chinese Application No. 2010010621015.1, 14 pages.

* cited by examiner

OPERATING SYSTEM INDEPENDENT NETWORK EVENT HANDLING

CROSS REFERENCE TO RELATED APPLICATION

The present application is a divisional of and claims priority under 35 U.S.C. §120 to U.S. patent application Ser. No. 12/645,145, entitled "OPERATING SYSTEM INDEPENDENT NETWORK EVENT HANDLING," filed Dec. 22, 2009, and incorporated herein by reference in its entirety.

TECHNICAL FIELD

This disclosure relates generally to system management, and more specifically, to handling of a wake event by a firmware environment of a computing device, independent of an operating system of the computing device, while the computing device remains in a low power consumption state.

BACKGROUND

Various mechanisms exist for reducing power consumption of computing devices. Standard technology for power management is specified in Advanced Configuration and Power Interface (ACPI) version 4.0, which may be found on the public Internet at URL www-acpi-info (note that periods have been replaced with dashes to avoid unintentional hyperlinks in this document). ACPI is a standard that most computer systems currently use for power management and describes how a computing system looks to the operating system (OS). Power management capabilities enable a computing device, both at component and system level, to transition its operating state between a higher power consumption state and a lower power consumption state. These modes of operation are often respectively called wake and sleep states or modes. The ACPI Specification defines seven states which a computing device may typically be in. For example, state S3 ("S3"), may be typically referred to as standby, sleep (also referred to herein as "sleep mode"), or suspend to RAM. State S5 ("S5") may be referred to as shutdown or "off."

A number of events may cause a computing device to transition between sleep mode and wake mode i.e., wake up or go to sleep. For instance, a sleep event, which triggers a computing device to transition to sleep, might include user inactivity or user selection. When a computing device transitions to sleep, many of the computing device components (e.g., main processor such as central processing unit (CPU), volatile memory, disk drives for mass storage, and so forth) may also go to sleep. Once asleep, a computing device may wake upon occurrence of a wake event. A wake event may include, for example, a receiving by the computing device of input from a mouse or keyboard, an e-mail message, or a query from a remote system administrator.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for handling a wake event by a firmware environment or firmware of a computing device, independent of the operating system of the computing device, when the computing device remains in a low power consumption sleep mode.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. The phrase "in one embodiment" is used repeatedly. The phrase generally does not refer to the same embodiment; however, it may. The terms "comprising," "having," and "including" are synonymous, unless the context dictates otherwise.

Figure 1:
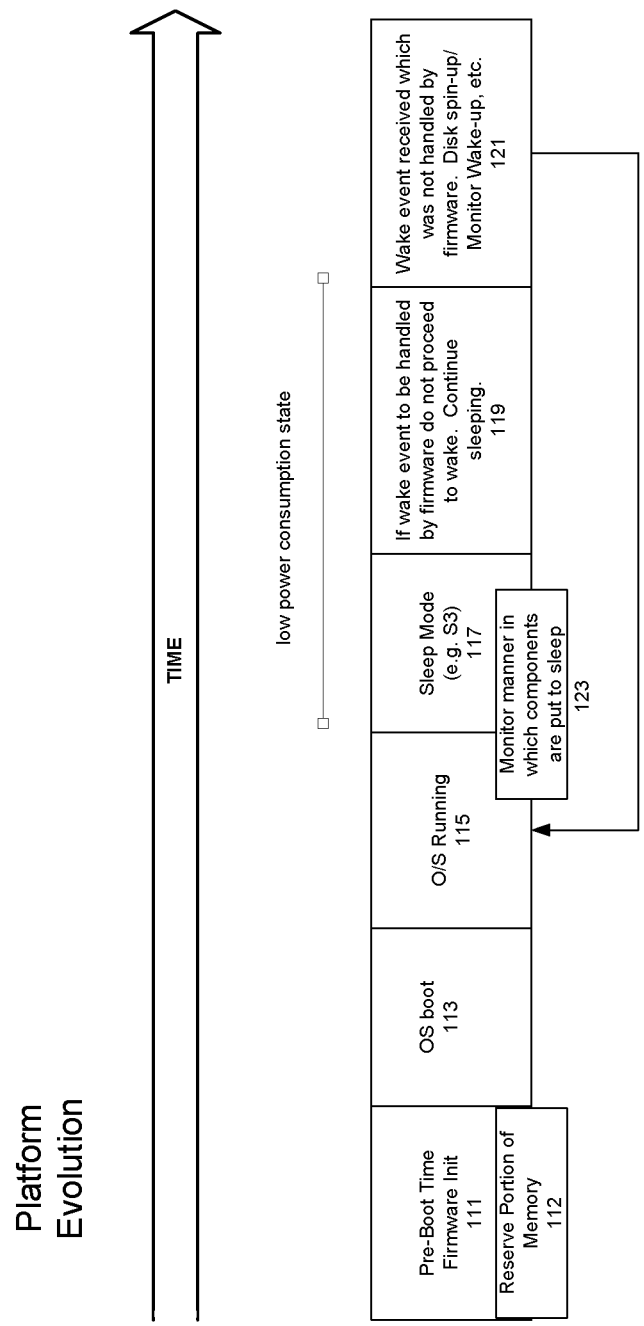
FIG. 1 is a timeline illustrating a transition of a computing device from a wake mode to a sleep mode, according to various embodiments.

FIG. 1 is a timeline illustrating a transition of a computing device from a wake mode to a sleep mode, in accordance with various embodiments. As described herein, in various embodiments, the firmware of a computing device may be enabled to accomplish work while the computing device is in sleep mode. The firmware can accomplish this work independently of the operating system, which results in increased functionality as well as reduced overall power consumption for the computing device. In embodiments, the computing device or system may be a desktop computer, laptop computer, mobile computing device, network server, thin client, or other computing device configured to utilize firmware. In embodiments, the firmware may be legacy basic input/output system (BIOS), Unified Extensible Firmware Interface (e.g. UEFI Specification Version 2.0, 2006) compatible, Extensible Firmware Interface (EFI) compatible (e.g., EFI Specification Version 1.10, 2004) or other firmware. Note that EFI is a public industry specification that describes an abstract programmatic interface between computing device firmware and operating system or other application environments. For example, EFI enables firmware, in the form of firmware modules, to be loaded from a variety of different resources, including flash memory devices, option ROMs (Read-Only Memory), various persistent storage devices (e.g., hard disks, CD-ROM (Compact Disk- Read Only Memory), etc.), or from one or more computer systems over a computer network. More information about the Unified EFI (UEFI) architecture may be found on the public Internet at www-uefi-org (note that periods have been replaced with dashes to avoid unintentional hyperlinks in this document). Thus, as described herein, in various embodiments, upon the transition to a sleep mode, a computing device may re-instantiate a UEFI or other firmware environment that includes one or more firmware functions available at pre-boot time. In embodiments, the re-instantiated firmware environment may enable the firmware environment to perform power management functions normally performed by the OS of the computing device.

Referring now to FIG. 1, in the embodiments shown, a computing device may be initialized during a pre-boot time by a firmware environment or also referred to as, firmware, at 111. In various embodiments and as will be discussed in more detail below, during this pre-boot time, the firmware may reserve a portion of memory or mailbox from which the firmware may later collect data at 112. Once pre-boot initialization is complete, control may be transferred to an operating system (OS) of the computing device to continue the boot process at 113. After OS or system boot, the OS may then run or operate the computing device in a functional or wake mode at 115, which includes a typically higher power consumption state associated with normal operations. The computing device may continue to operate in wake mode until 117, where a sleep event causes the computing device to transition to sleep mode S3, which includes a lower power consumption state. As noted above, sleep events may include a variety of events, such as for example, user selection or user inactivity.

After some time, in various embodiments, the computing device may receive a wake event. In some embodiments, the wake event may include a network event such as an e-mail, configuration directive, or other network transmission. In other embodiments, the wake event may be a sensing of an input at an input device, touching a keyboard of the computing device, receiving a network packet of a certain type, etc. Processing of wake events may be initiated by system management interrupts (SMIs), control line changes, register flags, or other constructs. In other cases, processing of wake events may be initiated by a chipset of the computing device. Furthermore, some wake events may trigger a powering up of the computing device for processing by the OS. Other wake events, as will be discussed below in relation to embodiments of the present disclosure, may be processed by the firmware while the computing device remains in sleep mode.

Accordingly, in various embodiments, the firmware, acting independently of the OS of the computing device, may determine whether the wake event can be handled without returning the entire computing device to the first higher power consumption state. If the wake event cannot be handled by the firmware and the OS is to handle the wake event, then disks may be spun up, the monitor may be turned on, and the computing device may be restored to full wake mode at 121. The process flow may then return to 115, where the OS runs or operates the computing device in wake mode. If, however, the firmware determines that the wake event can be handled independent of the OS and without returning the entire computing device to the first higher power consumption state, the firmware can cause the wake event to be handled. The computing device may thus continue to sleep at 119. In some embodiments, dependent on the wake event and without waking the entire computing device, the firmware may wake one or more hardware components or devices to service or complete a task associated with the wake event. Additionally, after completion of handling of the event, the firmware may return the hardware component to sleep mode which includes the second lower power consumption state.

Note that in the embodiments, at 123, a firmware component, such as for example, a filter driver, may begin to monitor and collect data related to a manner in which the OS transitions the one or more hardware components to sleep mode. In various embodiments, the filter driver may save the collected data to the mailbox or portion of memory that was reserved by the firmware during a pre-boot time at 112. The firmware may independently later use the collected data to transition the one or more hardware components needed to service the wake event to and or from sleep mode.

Figure 2:
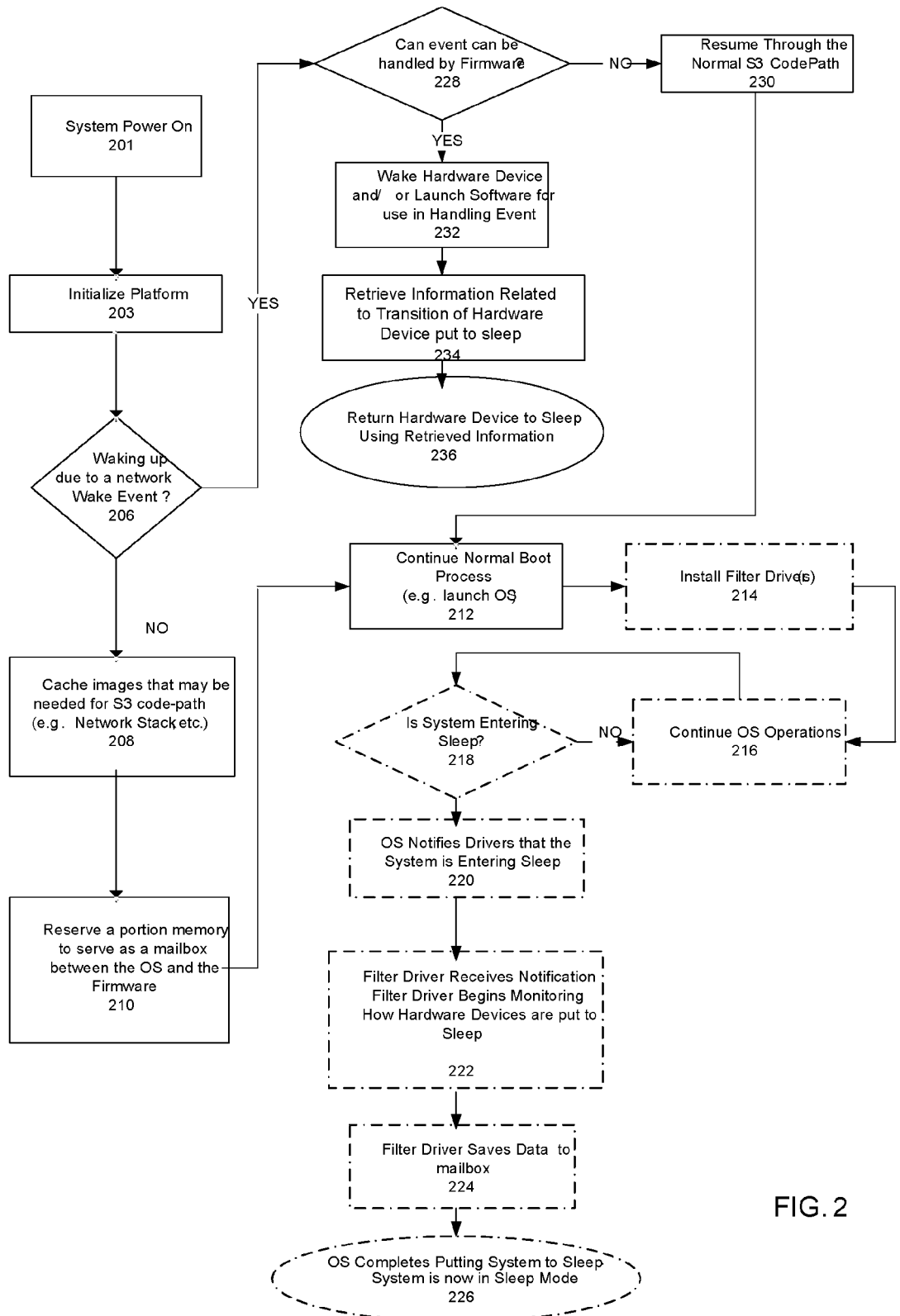
FIG. 2 is a flow diagram illustrating an exemplary method for handling by a firmware a wake event independent of an operating system (OS), according to various embodiments.

Next, FIG. 2 is a flow diagram illustrating an exemplary method for handling wake events independently of the OS, according to various embodiments of the disclosure. Blocks outlined by a solid line may, in an embodiment, by performed by the firmware. Blocks outlined with a broken line may, in an embodiment, be performed by the OS. It will be apparent to one of ordinary skill in the art that the term "performed by the firmware" is shorthand for a more complex computing device interaction. In a single processor system, for instance, instruction execution may be performed by a main processor, or central processing unit (CPU). Note that "Performed by the firmware" may mean that non-operating system instructions are fetched from a non-volatile memory store (firmware), coupled to the processor and then executed by the processor. The processor has access to the firmware prior to loading the OS. Thus, boot instructions may be typically stored in a firmware boot block. Furthermore, in some embodiments, the full boot block may reside remotely, and the local boot block may contain a pointer to the remote location of the full boot block.

In the embodiments of FIG. 2, a computing device or system may be powered on at block 201. The platform may be preliminarily initialized by the boot block firmware in block 203. Other portions of the firmware, residing outside of the boot block, may play a role in the preliminary initialization. Note that the boot block is typically responsible for early aspects of initialization such as early memory initialization and central processor initialization. Preliminary initialization may also include identifying and resetting memory, identifying devices and components coupled to the computing device, etc.

In the embodiments shown, as a part of preliminary initialization or soon afterwards, the firmware may initiate a number of policy questions to determine a status of the computing device. In the embodiments, the firmware may ask at a block 206, whether the computing device is waking up or transitioning out of sleep mode, due to a wake event (e.g. network wake event in this embodiment). In various embodiments, where the computing device is not waking up due to a network wake event, but has simply completed powering up, the pre-boot process may continue to a block 208. At block 208, the firmware may proceed to cache images that may be needed at a later time. For example, it may cache data needed for a sleep mode (e.g. S3). Next, at a block 210, the firmware may reserve, during this pre-boot time, a portion of memory in a tangible-computer readable storage medium of the computing device. In an embodiment, the portion of memory may serve as a mailbox of the firmware. Note that typically, computing device resources are under control of the OS unless the firmware actively reserves such resources for itself. Furthermore, in various embodiments, to be discussed below, input/output (I/O) data related to a manner in which the OS may transition one or more hardware components to sleep may be saved (e.g. by a monitoring component of the OS) into the mailbox to be accessed at a later time by the firmware. In the embodiments, enough memory may also be reserved that may allow the firmware to reinitialize previously cached images.

In the embodiments shown, at a next block 212, the firmware may continue a normal boot process and the OS may be given control and launched. At block 214, the OS may install a component, such as, for example, a filter driver. As will be seen below, the filter driver may serve as the monitoring component to collect I/O data related to transition of the hardware components to sleep mode. Normal OS operations may continue at a block 216. At a decision block 218, if input has not been received for a certain period of time or other computing device policy dictates, the OS may transition the computing device to sleep mode. If, for example the policy does not dictate that the computing device transition to sleep mode, OS operations may continue at a block 216. In the alternative, returning to decision block 218, if the computing device is to enter sleep mode, the OS may continue downward from decision block 218 to block 220. In the embodiment, the OS may then send a message notifying all or substantially all hardware component or hardware device drivers that the hardware components are to transition to sleep mode. The filter driver may receive or detect this notification at block 222 and begin monitoring input/output (I/O) data related to a manner in which the one or more hardware devices or components are transitioned to sleep mode, e.g. I/O signals between a hardware device interface and the hardware device driver. At a block 224, the filter driver then may collect the I/O data and save it to the mailbox which was reserved by the firmware environment at a pre-boot time (described at block 210). Finally, at a block 226, the OS has completed transitioning the computing device to sleep mode.

Note that the I/O data saved to the mailbox at block 224, as alluded to earlier, may be used at a later time to enable the firmware to use the I/O data during and/or after the handling of a wake event. Thus, for example, returning up to decision block 206, if the computing device is waking up due to a wake event e.g. network wake event, the YES arrow may be followed. At a block 228, the firmware may determine, while the OS remains in sleep mode, whether the network event can be handled by the firmware, independent of the OS and without waking or returning the entire computing device to a higher power consumption state. If the answer is NO, the computing device resumes through the normal S3 codepath at block 230 and eventually continues the normal boot process at 212. If the answer is YES, however, the firmware may cause the network event to be handled independently of the OS. In some embodiments, at a block 232, the firmware may wake or transition only one or more (but not all) hardware components to a higher consumption state and/or launch software for use in handling the network event. At a block 234, the firmware may retrieve the I/O data and/or other information saved in the mailbox by the filter driver. Finally, at a block 236, on completion of the handling of the network event, the firmware returns/transitions the hardware device to sleep using the retrieved I/O data.

Thus, in various embodiments, a firmware environment of a computing device is re-instantiated once a computing device transitions to sleep mode. In embodiments, the firmware environment is enabled to perform power management functions normally performed by the OS of the computing device. In some embodiments, not only does the computing device have an ability to transition certain hardware components to sleep, e.g. those associated with a network transmission received by the computing device during sleep mode, the firmware environment is able to initiate a transition to wake mode a plurality of additional hardware or other components of the computing device. In various embodiments, the firmware environment is enabled to retrieve I/O data related to a manner in which any of a plurality of hardware devices are transitioned to sleep mode. Such I/O data may be retrieved from a mailbox that was reserved by the firmware during a preboot time. In various embodiments, the firmware environment is enabled to transition the hardware components to sleep mode, a power management function typically only performed by the OS.

Figure 3:
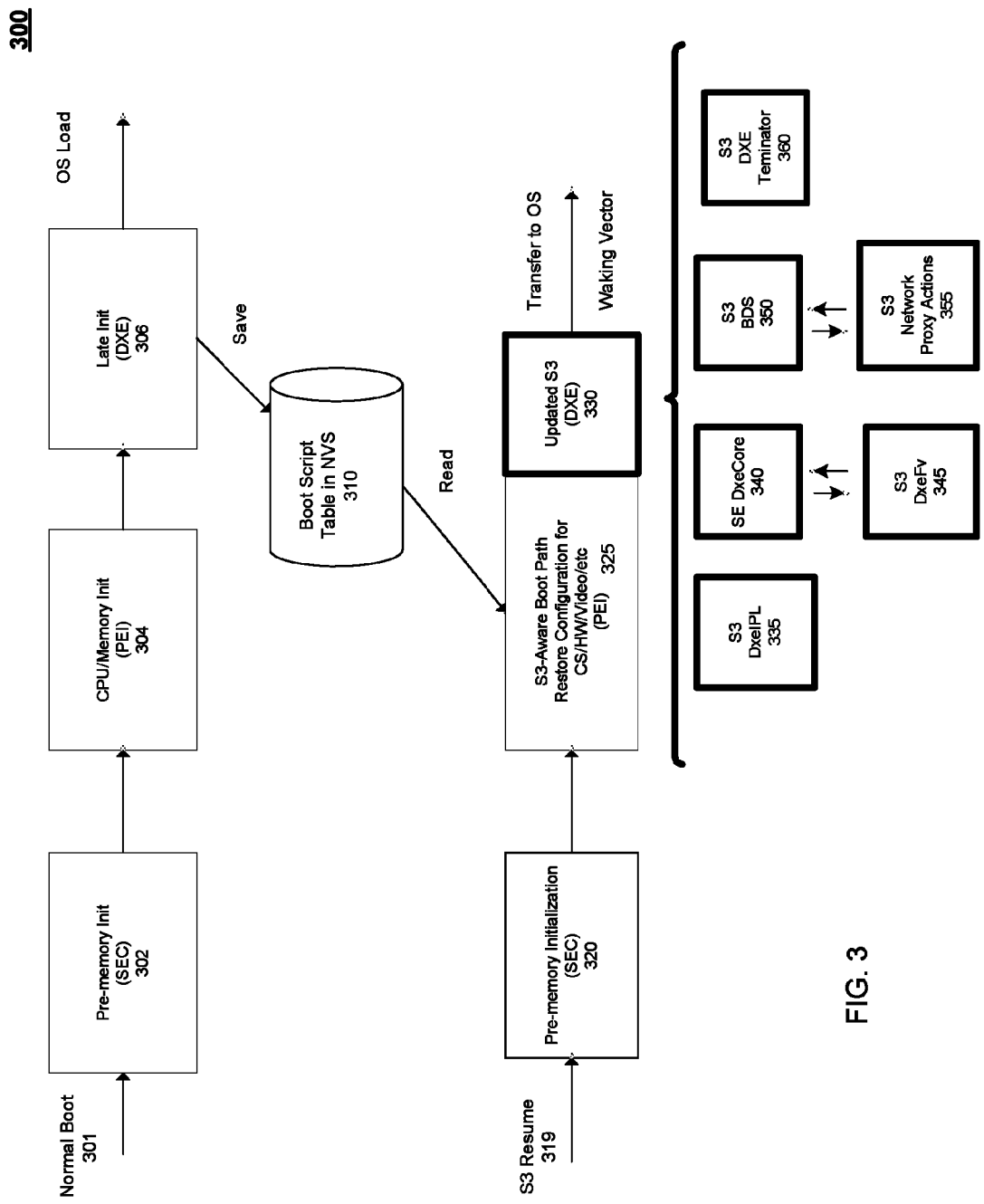
FIG. 3 is a block diagram illustrating a boot and wake cycle in a computing device, according to various embodiments.

Referring now to FIG. 3, embodiments may conjoin a module S3 resume architecture of, for instance, the Platform Innovation Framework for the Extensible Firmware Interface (EFI)—Draft for Review, Version 0.9, Sep. 16, 2003, available at www-intel-com/technology/framework (note that periods have been replaced with dashes to avoid unintentional hyperlinks). Typically, for example, according to a UEFI Platform Initialization (PI) Specification, version 2.3, published May 8, 2009, a full complement of PI pre-EFI (PEI) modules and PI Driver Execution Environment (DXE) drivers may be invoked during boot from an S5 mode ("off"). As a result, a UEFI environment that may be used by pre-OS applications, e.g. UEFI shell, 3rd party UEFI drivers/option ROM's, and UEFI OS loaders, is created. During S3, however, because of S3 resume time constraints, the computing device may run a standard PI resume flow that may typically include only a subset of PEI without DXE. As such, during an S3 resume mode, rich UEFI driver features may not be available. However, various embodiments of the disclosure provide that a computing device may implement DXE 330 during S3. Thus, as shown by the bold portions of FIG. 3, S3 may include DXE to recreate a UEFI environment in some pre-OS sequestered (or OS driver pinned) pages for running UEFI boot service applications while the OS is in sleep mode.

Referring now to FIG. 3, shown in the embodiments, a block diagram 300 illustrates a boot and wake cycle, implemented according to a UEFI architecture. In the embodiment, during a normal boot 301 after a power-on or reset, a security (SEC) phase 302 ("SEC 302") may begin. SEC 302 may support security checks of an initial operating code to be executed on a computing device. Next, in the embodiment, SEC 302 may transition to a pre-EFI (PEI) phase 304 ("PEI 304"). PEI 304 may provide, for example, a method of loading and invoking specific initial (INIT) configuration routines for a processor, chipset, and motherboard. PEI 304 may discover memory and prepare a resource map that may be handed off to a driver execution environment (DXE) phase 306 ("DXE 306"). DXE 306 may include the invoking of DXE 306 drivers responsible for initializing the processor, chipset, and platform components as well as providing software abstractions for console and boot devices. As shown at 310, DXE 306 may save I/O controller settings as part of a boot script table in a reserved memory such as a non-volatile store (NVS). A boot script may include a set of actions to be replayed upon an S3 restart to bring the computing device back to a state it was in before transitioning into sleep mode. A typical boot script will restore I/O device and CPU state information.

As seen at 319, in an S3 resume boot, SEC 320 may be implemented. Next, at 325, S3 PEI modules may restore PEI phase configurations from the NVS in 310, e.g. basic restoring of chipset, hardware, and video settings. Thus, in embodiments, DXE 330 may be implemented during S3, while the OS is sleeping. DXE 330 may be facilitated by several components or phases, including a DXE initial program load (IPL) 335, DXE core 340, DXE Firmware Volume (FV) 345, Boot Device Selection (BDS) 350, Network Proxy Actions 355, and DXE Terminator 360. As noted above, an instantiation of a substantially fully formed UEFI interface may be implemented as a result of including DXE 330 in S3. Typically, only a smaller number of UEFI drivers are added during a pre-boot phase. In embodiments of the disclosure, however, an OS driver may add additional UEFI drivers into the UEFI environment. In various embodiments, UEFI drivers may be collected from alternate sources. In some embodiments, these additional drivers may be provisioned on a UEFI system partition or via other methods enhance the number of UEFI drivers available during DXE 330.

Figure 4:
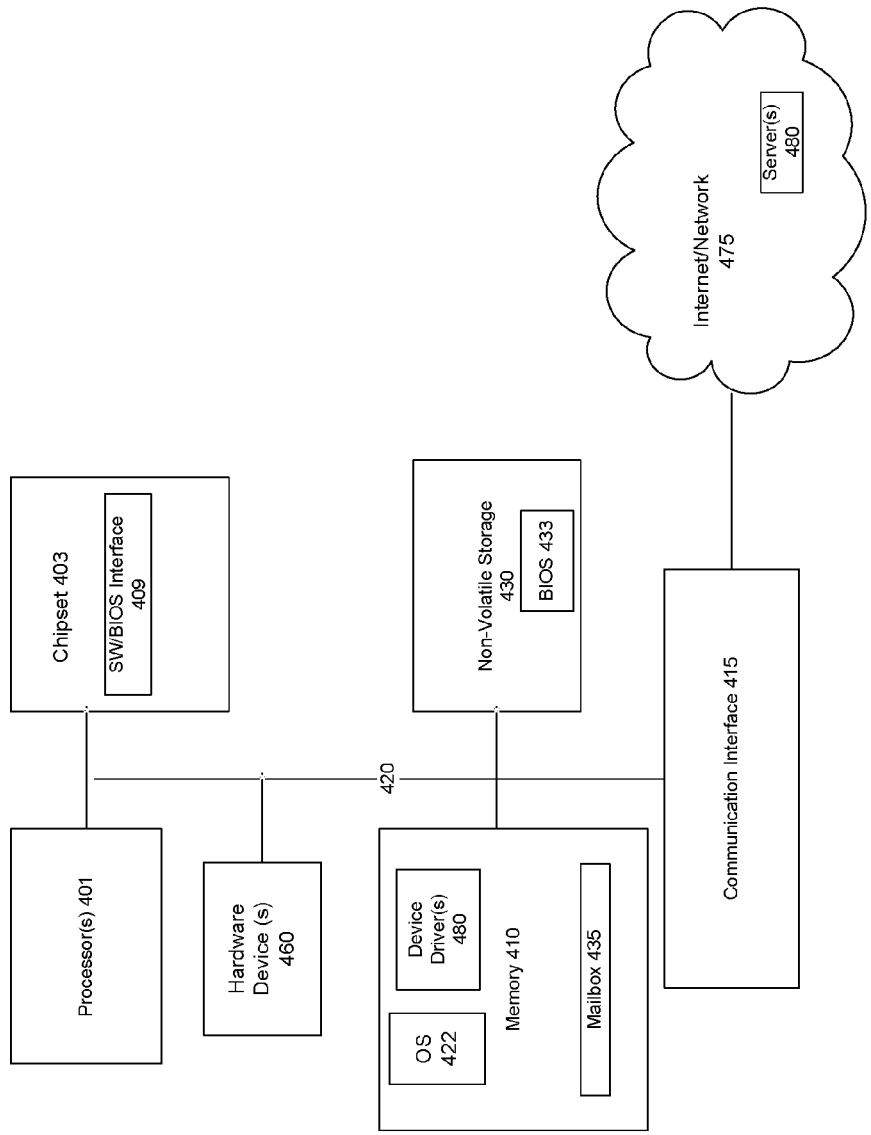
FIG. 4 is a block diagram illustrating an exemplary computing device, according to various embodiments.

Finally, FIG. 4 illustrates an exemplary computing device 400 in which an embodiment of the present disclosure may reside. In various embodiments, a computing device 400 comprises various elements coupled via a bus 420. As shown, the elements may include a processor 401, memory 410, a chipset 403, hardware device(s) 460, a non-volatile storage 430, such as flash memory, and communications interface 415. Chipset 403 may be endowed with the earlier described firmware. Memory 410 may include OS 422, earlier described mailbox 435, and device driver(s) 480. Processor 401 may be any type of processor capable of executing software, such as a microprocessor, digital signal processor, microcontroller, or the like. Though FIG. 4 shows only one such processor 401, there may be one or more processors in computing device 400 and one or more of the processors may include multiple threads, multiple cores or the like. In various embodiments, a component 422 may determine or collect information related to a transition of one or more hardware devices 460 between a first higher power consumption state and a second lower power consumption state by monitoring I/O signals on bus 420 communicated between a hardware interface of one or more hardware devices 460 and device driver(s) 480. While in sleep mode, the firmware may handle one or more network or wake events as earlier described.

The communications interface 415 may include a networking interface such as a network interface card (NIC) or the like. The NIC may be communicatively coupled to an Internet/Network 475 including a remote server or server(s) 480 via, e.g., a serial over local area network (LAN) interface. The communication interface may support Transfer Control Protocol/Internet Protocol (TCP/IP), hypertext transfer protocol (HTTP) or Simple Object Access Protocol (SOAP), or other communication protocol. The NIC may use other means to communicate over a network, for instance, Integrated Drive Electronics (IDE) redirection (not shown) or other means. Note that in embodiments, handling a wake event may include but is not limited to responding to particular packet types, keeping dynamic host configuration protocol (DHCP) leases alive, low power background activities, such as for example, scanning memories for viruses, and remote file backups/restores, and the like. In the embodiment shown, the chipset 403 may also include a software interface for a basic input output system (BIOS) 409.

The techniques described herein are not limited to any particular hardware or software configuration; they may find applicability in any computing, consumer electronics, or processing environment. The techniques may be implemented in hardware, software, or a combination of the two.

The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. One of ordinary skill in the art may appreciate that the disclosure can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Program instructions may be used to cause a general-purpose or special-purpose processing system that is programmed with the instructions to perform some the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

What is claimed is:
1. A computing device comprising:
one or more processors;
a filter driver, coupled with the one or more processors, to:
determine hardware transition information related to a transition of a hardware device of the computing device from a first higher power consumption state to a second lower power consumption state, by monitoring input/output (I/O) signals associated with the hardware device that relate to how an operating system of the computing device transitioned the hardware device from the first higher power consumption state to the second lower power consumption state, the hardware transition information comprising information associated with how to transition the hardware device from the first higher power consumption state to the second lower power consumption state; and
save the hardware transition information for access by a firmware module; and
the firmware module, coupled with the one or more processors, to:

transition, in response to a wake event, the hardware device to the first higher power consumption state from the second lower power consumption state to allow the hardware device to service the wake event; and transition, on completion of the servicing of the wake event, the hardware device back to the second lower power consumption state utilizing the saved hardware transition information.

2. The computing device of claim 1, further comprising memory, wherein the firmware module is further to reserve, during a pre-boot time of the computing device, a portion of the memory to store the hardware transition information.

3. The computing device of claim 1, wherein the wake event comprises receipt of a network event or receipt of data from an input device.

4. The computing device of claim 1, wherein the filter driver is further to receive a notification that an operating system (OS) of the computing device is transitioning the computing device from the first higher power consumption state to the second lower power consumption state, and wherein to determine hardware transition information is performed upon receipt of the notification.

5. The computing device of claim 1, wherein to transition the hardware device to the second lower power consumption state from the first higher power consumption state is performed independent of an OS of the computing device.

6. The computing device of claim 1, wherein to service the wake event comprises at least one of: transmission of a response to one or more predefined network packet types; maintenance of dynamic host configuration protocol (DHCP) leases; perform a scan of memory of the computing device for viruses; or perform remote file backup/restoration.

7. A computer-implemented method comprising:
determining, by a filter driver of a computing device, hardware transition information related to a transition of a hardware device of the computing device from a first higher power consumption state to a second lower power consumption state, by monitoring input/output (I/O) signals associated with the hardware device that relate to how an operating system of the computing device transitioned the hardware device from the first higher power consumption state to the second lower power consumption state, the hardware transition information comprising information associated with how to transition the hardware device from the first higher power consumption state to the second lower power consumption state;
storing, by the filter driver, the hardware transition information for access by a firmware module;
retrieving, by the firmware module of the computing device, the hardware transition information to be utilized in handling of a wake event without waking the entire computing device;
transitioning, by the firmware module, the hardware device to the first higher power consumption state from the second lower power consumption state to allow the hardware device to service the wake event; and
transitioning, by the firmware module on completion of the servicing of the wake event, the hardware device back to the second lower power consumption state utilizing the stored hardware transition information.

8. The method of claim 7, further comprising: reserving, by the firmware module, during a pre-boot time of the computing device, a portion of memory to store the hardware transition information.

9. The method of claim 7, wherein the wake event comprises receipt of a network event or receipt of data from an input device.

10. The method of claim 7, wherein the monitoring of the input/output (I/O) signals is performed by the filter driver in response to the filter driver receiving a notification that an operating system (OS) of the computing device is transitioning the computing device from the first higher power consumption state to the second lower power consumption state.

11. The method of claim 7, wherein handling the wake event comprises handling the wake event independent of an OS of the computing device.

12. The method of claim 7, wherein handling the wake event comprises at least one of: responding to one or more predefined network packet types, maintaining dynamic host configuration protocol (DHCP) leases, performing a scan of memory of the computing device for viruses, and performing remote file backup/restoration.

13. One or more non-transitory computer-readable storage media having a plurality of instructions stored thereon which, in response to execution of the plurality of instructions by a processor of a computing device, provide the computing device with a firmware environment to:
determine hardware transition information related to a transition of a hardware device of the computing device from a first higher power consumption state to a second lower power consumption state, by monitoring input/output (I/O) signals associated with the hardware device that relate to how an operating system of the computing device transitioned the hardware device from the first higher power consumption state to the second lower power consumption state, the hardware transition information comprising information associated with how to transition the hardware device from the first higher power consumption state to the second lower power consumption state;
save the hardware transition information for access by a firmware module;
transition the hardware device to the first higher power consumption state from the second lower power consumption state in response to receipt of a wake event to allow the hardware device to service the wake event; and
transition, on completion of the servicing of the wake event, the hardware device back to the second lower power consumption state utilizing the saved hardware transition information.

14. The computer-readable storage media of claim 13, wherein the firmware environment is further to reserve, during a pre-boot time of the computing device, a portion of memory and store the hardware transition information in the portion of memory.

15. The computer-readable storage media of claim 13, wherein the wake event comprises receipt of a network event or receipt of data from an input device.

16. The computer-readable storage media of claim 13, wherein the firmware environment is further to receive a notification that an operating system (OS) of the computing device is going to transition the computing device from the first higher power consumption state to the second lower power consumption state, and wherein to determine hardware transition information is performed upon receipt of the notification.

17. The computer-readable storage media of claim 13, wherein to transition the hardware device to the second lower power consumption state from the first higher power consumption state is to be performed independent of an OS of the computing device.

18. The computer-readable storage media of claim 13, wherein to service the wake event comprises at least one of: transmission of a response to one or more predefined network packet types; maintenance of dynamic host configuration protocol (DHCP) leases; perform a scan of memory for viruses; or perform remote file backup/restoration.

19. One or more non-transitory computer-readable storage media having a plurality of instructions stored thereon which, in response to execution of the plurality of instructions by a processor of a computing device, provide the computing device with a firmware environment to:
collect and save hardware transition information related to a transition by an operating system (OS) of a hardware device of the computing device from a first higher power consumption state to a second lower power consumption state by monitoring input/output (I/O) signals associated with the hardware device during the transition of the computing device, the hardware transition information comprising information associated with how to transition the hardware device from the first higher power consumption state to the second lower power consumption state;
receive a network event while the computing device is in the second lower power consumption state;
determine, independent of the OS, while remaining in the second lower power consumption state, whether the network event can be handled without returning the entire computing device to the first higher power consumption state;
return the hardware device to the first higher power consumption state to handle the network event when it is determined that the network event can be handled without returning the entire computing device to the first higher power consumption state;
retrieve, on completion of handling of the network event, the saved hardware transition information; and
return, independent of the OS, the hardware device to the second lower power consumption state utilizing the saved hardware transition information.

20. The one or more computer-readable storage media of claim 19, wherein the network event is a wake event comprising receipt of: an email, configuration directive, or other network transmission.

21. The one or more computer-readable storage media of claim 19, wherein the firmware environment is further to reserve, during a pre-boot time of the computing device, a portion of memory to serve as a mailbox.

22. The one or more computer-readable storage media of claim 21, wherein the firmware environment is further to store the hardware transition information to the mailbox to enable the firmware environment to access the hardware transition information during the handling of the network event.

23. The one or more computer-readable storage media of claim 19, wherein to collect and save the hardware transition information, the firmware environment is further to:
monitor input/output (I/O) signals communicatively coupling a hardware interface of the hardware device during a transition of the hardware device to the second lower power consumption state by the OS;
collect the hardware transition information from the I/O signals; and
save the hardware transition information in a memory of the computing device.

* * * * *